Nov. 14, 1950  F. O. HESS  2,529,689
PROCESS OF HEAT-TREATING METAL WORK
OF ELONGATED EXTENT
Filed March 23, 1944  4 Sheets-Sheet 1
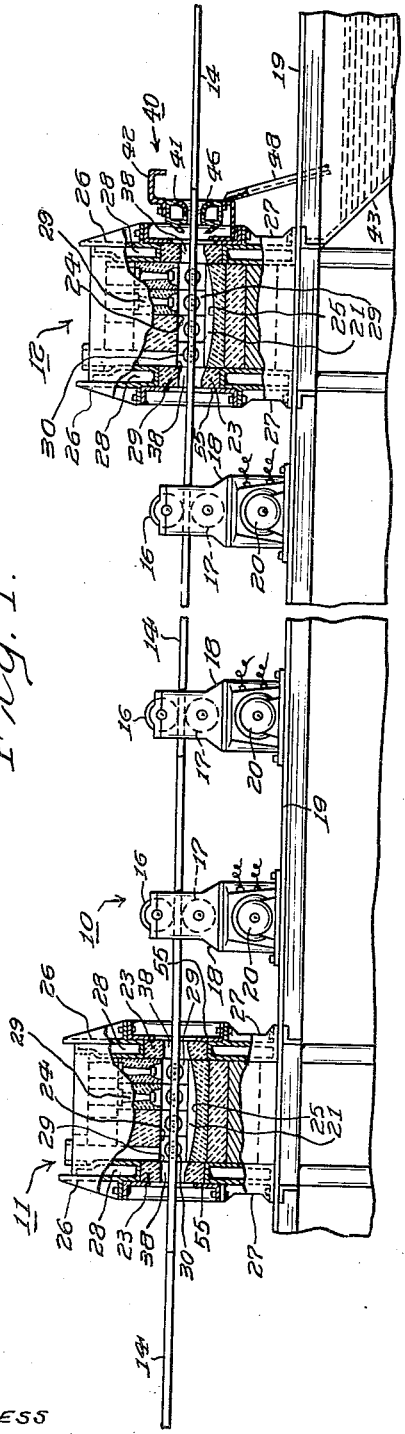
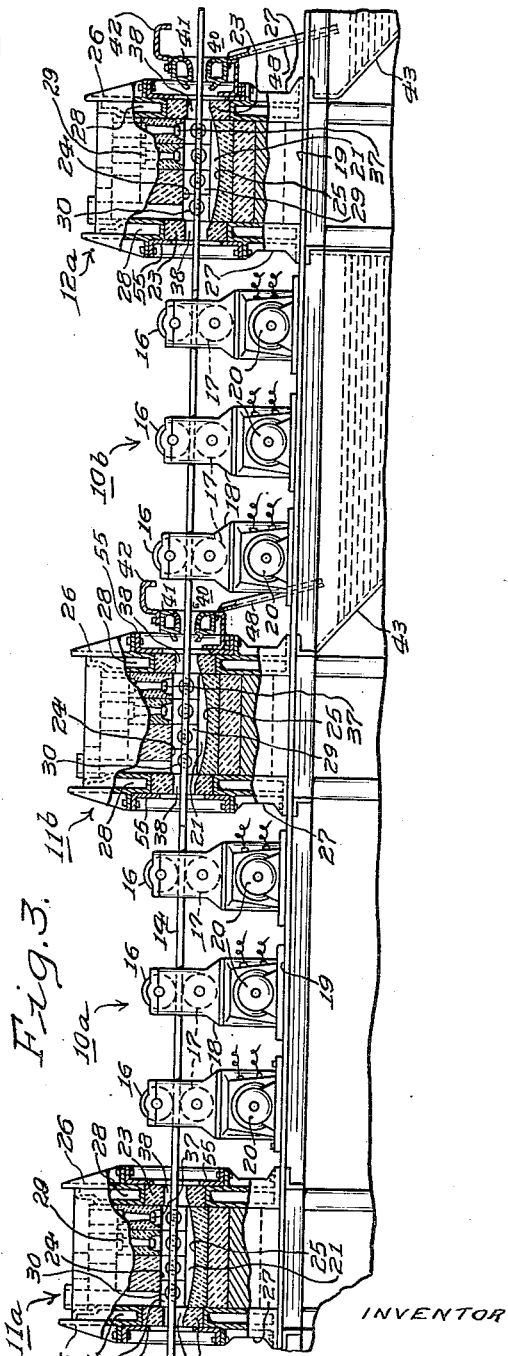
INVENTOR
Frederic O. Hess

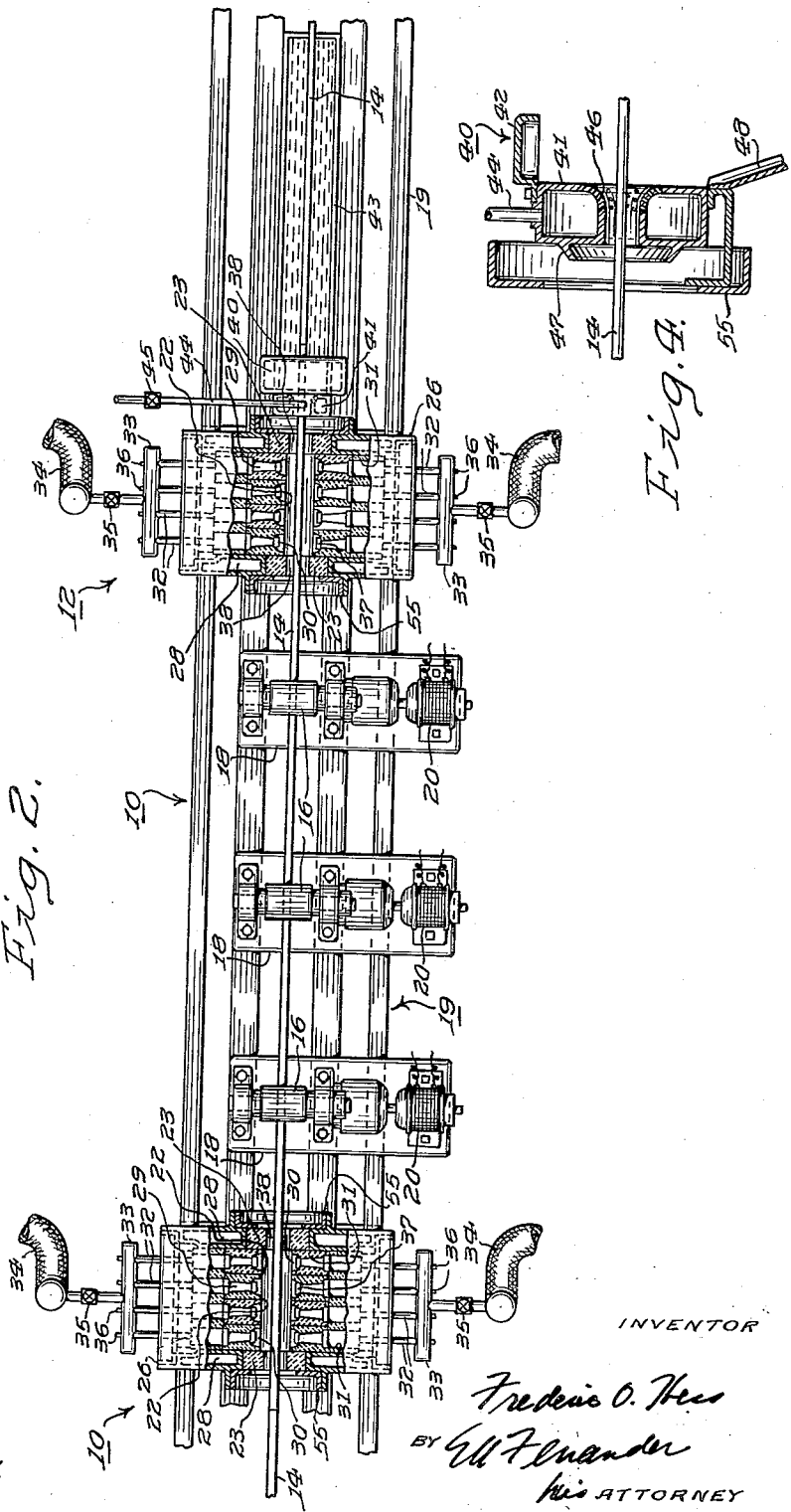

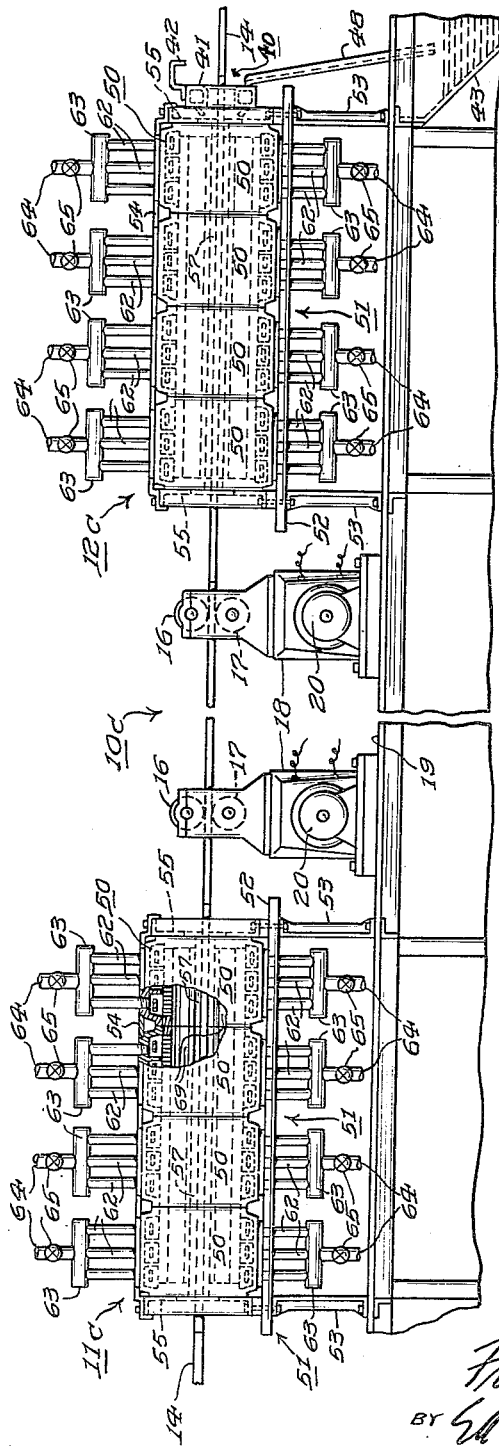

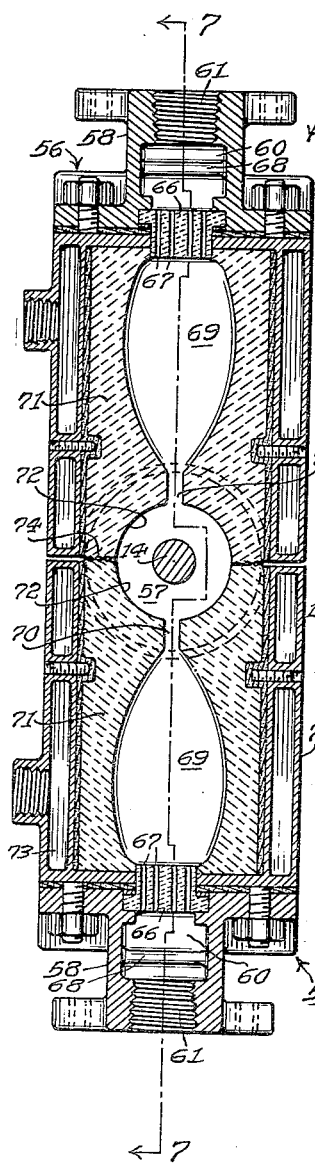
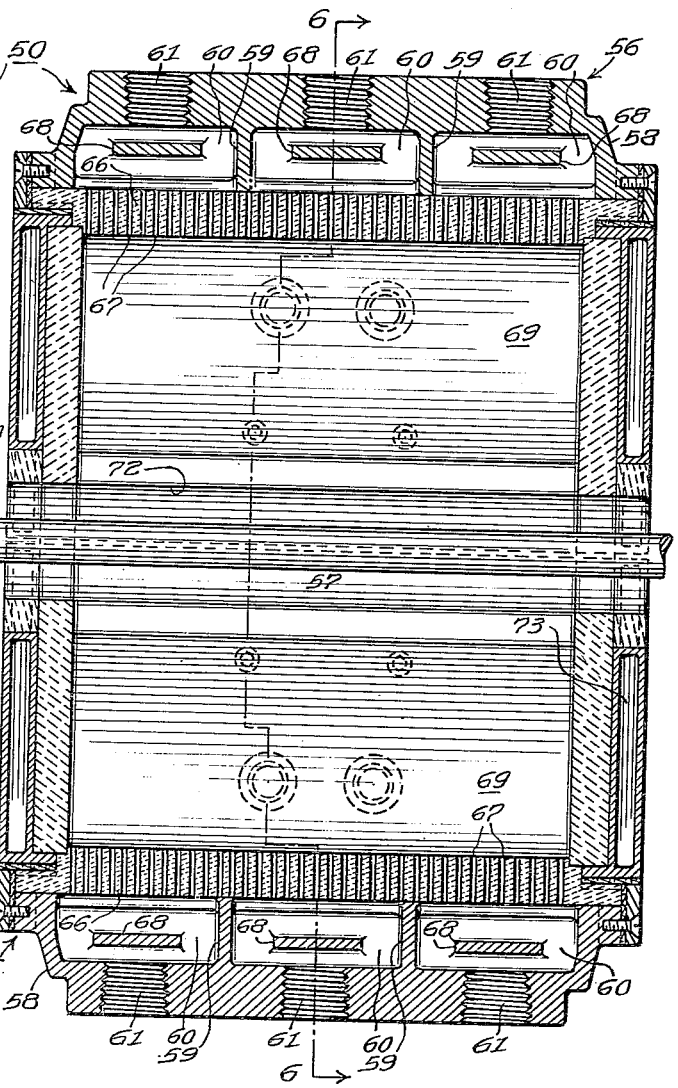

Patented Nov. 14, 1950

2,529,689

UNITED STATES PATENT OFFICE 2,529,689

PROCESS OF HEAT-TREATING METAL WORK OF ELONGATED EXTENT

Frederic O. Hess, Philadelphia, Pa., assignor to Selas Corporation of America, Philadelphia, Pa., a corporation of Pennsylvania Application March 23, 1944, Serial No. 527,771

8 Claims. (Cl. 148—13.1)

My invention relates to processing work, and more particularly to processing work wherein unheated work or stock is rapidly heated or heat saturated to a high temperature while being moved continuously in a path of movement in which one or more working operations are performed on the heated work, and in which such heating of the work or stock during continuous movement thereof may be effected as rapidly as the working operation or operations are performed on the stock.

In processing metal work or stock, such as, for example, bar stock, rods, tubing, sheets, strips and like work formed of ferrous metal, brass, copper and other metals, the stock to be processed usually is unheated and at the temperature of the surroundings. This is so because in many plants in which metal stock is further processed, the stock is generally procured from an outside source. Even in plants having facilities for producing metal stock requiring further processing, it is customary to make a quantity of a particular metal stock at one time and then further process the stock as needed. Also, in existing plants the facilities for producing metal stock usually are not located at the same part of the plant as the equipment employed for further processing the stock.

It is generally recognized that working operations can be performed faster and at less cost on metal, plastics, glass and other materials when work or stock formed of such materials is heated to a high temperature. When metal stock to be processed is heated to high temperatures, for example, the metal working operations, such as forging, rolling, swaging and extruding, can be performed with considerably less power. Thus, in a continuous metal working process, as in a rolling mill, for example, either less power is required for a given reduction of the metal stock when the stock is heated to high temperatures preparatory to the metal working operations, or a much greater reduction of the metal stock can be effected for the same power requirement when the metal stock is heated to a high temperature preparatory to the metal working operations.

In existing plants it has generally been the practice to provide separate furnaces for heating the metal stock preparatory to the metal working operations, and in many cases to provide additional furnaces for reheating the metal stock after only a portion of the metal working operations have been performed, so that the metal working operations can be completed while the the stock is at a high temperature. When separate furnaces of this character are employed to perform hot rolling or hot metal working operations, provision must be made for placing the metal stock in a furnace and subsequently removing the heated stock therefrom to the metal working equipment. This is objectionable because the metal stock requires many handling operations for heating the stock either preparatory to the hot metal working operations or after only a part of the metal working operations have been performed.

Further, heating of metal stock in such separate furnaces to bring the metal to a high temperature is relatively slow and requires long heating periods. In addition to the unduly long time required to heat metal stock in separate furnaces, which often runs into heating periods of many hours duration, such long heating periods and handling operations are conducive to and promote the formation of scale on the surfaces of metal stock which tends to bond to the metal. The thickness of this scale, which is due to oxidation, is dependent upon the length of the heating periods and the length of time that it takes to remove the heated metal stock from the separate heating furnaces and actually begin the working operations in the metal working equipment. When a substantial layer of scale is formed on the heated metal stock, the hazard of rolling scale into the metal stock during the metal working operations is materially increased. When scale is rolled into the metal stock or work and forms defects in the latter, subsequent rolling or working of the metal stock elongates the defects. Such defects must either be removed from semi-finished products, or the finished product in which such defects ultimately appear must necessarily be rejected.

After metal stock has been subjected to metal working operations, the stock or work becomes what is referred to as "work hardened." When this occurs the metal stock is usually annealed. It has been customary to effect such annealing of metal stock as an entirely separate operation in furnaces quite often removed from the metal working equipment. This is especially true where bright annealing of the metal stock or work is desired, because furnaces heretofore employed and located in the general vicinity of the metal working equipment are not capable of producing a bright anneal. In addition to the objectionable handling operations required to accomplish this annealing, there is the additional inconvenience of the relatively long heating periods due to the relatively slow rate at which the work is heated by these usual conventional practices.

I have found that the cost of processing work or stock can be reduced considerably by continuously moving the work to be processed in a path of movement in which unheated work is first heated rapidly to a high temperature by localized high temperature heating effects during movement of the work past a heating station, and in which the thus heated work is then immediately fed to the equipment for working the stock, such heating of the stock or work to the desired high temperature being effected as rapidly as the working operation or operations can be performed on the heated work by the processing equipment.

To effect rapid heating of the stock or work I preferably employ a plurality of sources of radiant heat which are heated to high incandescent temperatures and from which heat is radiated to the stock or work as it passes through the heating station. The sources of radiant heat produce localized heating effects at extremely high temperatures, whereby heat can be rapidly applied to the stock or work at the heating station. Such a heating station constitutes one step of a continuous work processing operation requiring no handling of the stock from the time the unheated stock is removed from a receiving point and placed "on the processing line" for movement toward the heating station to the time the desired working operation or operations and heat treatment have been accomplished.

The sources of radiant heat may be heated to incandescence by heat derived from combustion or burning of a combustible gaseous mixture in which the high temperature gases thus produced are utilized to blanket the radiant heat sources and develop high incandescent temperatures. In order to develop extremely high temperature sources of radiant heat in this manner, combustion of the combustible gaseous mixtures is effected at pressures above atmospheric. By doing this the rate of combustion is accelerated considerably and the temperature at which combustion takes place is increased. In addition to heating the stock or work by radiated heat applied by the radiant heat sources, the resulting high temperature gases produced may be directed at a high velocity toward the stock or work passing through the heating station, so that the stock or work will also be heated by superimposed convection heating.

When work, such as metal stock, for example, is rapidly heat treated in a continuous processing operation requiring no handling of the stock for removal to separate heating furnaces, the formation of scale on the work is reduced considerably. In the case of ferrous metals, the exceptionally fast heating time produces an additional advantage in that decarburization is materially reduced. Decarburization results from the formation of water vapor produced with combustion of the combustible gaseous mixture. By rapidly heating the metal stock in a relatively short time by heat radiated from high temperature sources of radiant heat, together with heat derived from the high temperature combustion gases, the ferrous metal is not subjected to decarburization to the same extent as when heating of such work is effected in the usual furnaces heretofore employed in which the work is heated at a slow rate for a long period of time.

A second heating station may be incorporated in the continuous processing operation for heating stock or work after it has been fed through processing or working equipment. The second heating station may be provided simply to heat the work further, so that additional working operations can be performed while the stock or work is at a desired high temperature; or, in the case of metal work or stock, for the purpose of annealing such work after it has become "work hardened." Provision may be made for quenching the work immediately after passing through the second heating station when such quenching is desired.

In any particular installation, the desired number of heating stations may be interposed between sections or stages of the equipment provided to perform the working operations, depending upon the character and physical properties of the stock and the nature of the working or processing operations to be performed. A heating station may also be provided at the end of the continuous processing operation to heat treat the finished shape or end product, so that the desired physical properties will be imparted thereto.

Irrespective of whether one or a plurality of heating stations are provided in the continuous work processing operation, each station may be attuned to effect the desired heating of the stock or work at the speed or rate at which the working or processing operations are performed by the material working equipment. In this way, work or stock can be moved through the heating station or stations and fed through the material working equipment in a single continuous operation without the necessity of separate handling; and, especially when working or processing of metal stock is involved, without resorting to separate handling of the work in a furnace of the slow heating type heretofore customary in practice.

The heating stations referred to above are to be distinguished from the usual and customary furnaces heretofore employed for heat treating stock or work formed of metal. In such furnaces a quantity of work is heated simultaneously at a relatively slow rate, and quite often heated work pieces are removed from one end of the furnace while unheated work pieces are inserted at the other end for movement therethrough for a heating period of many hours duration.

The heating stations referred to above are considerably smaller than the usual separate furnaces heretofore employed, and are of a size commensurate with the size of the metal stock or work to be processed. This reduction in the size of the heating equipment and immediate association thereof with the material working equipment for continuously processing work is realized by applying heat to the work during movement thereof in the manner described above, and by positioning the sources of radiant heat relatively close to the work. Thus, in heating bar stock or rods, for example, successive portions of such stock are progressively heated while the work is being moved lengthwise through the heating station, such heating being rapidly effected by localized high temperature heating effects as fast as the working operations are performed on the work by the material working equipment.

An object of my invention is, therefore, to rapidly heat stock or work by high temperature localized heating effects and also process or work the heated stock in a continuous processing operation without the necessity of handling the work while such heating and processing or working of the stock are being accomplished.

Another object of my invention is to process or work heated stock or work, and immediately prior to such processing or working operations to heat the work rapidly to a high temperature and as fast as the processing or working operations are performed, such heating and working operations being effected as successive steps in the continuous processing of the work without the necessity of any work handling.

A further object of my invention is to interpose heating stations in material working equipment at one or more places in the path of movement of the work to expedite and facilitate the hot working or processing of stock or work, and also provide a final heating station to impart the desired physical properties to the product, each of the heating stations being of a character whereby the stock can be rapidly heated to a desired high temperature at a rate as fast as the material working operations can be performed by the processing or working equipment.

A still further object of my invention is to provide in a continuous metal processing operation a first heating station ahead of metal working equipment and a second heating station into which the work is fed from the metal working equipment for annealing the "work hardened" work, each of the heating stations being capable of heating the work rapidly and at a rate as fast as the metal working operations are performed on the heated work.

A still further object of my invention is to apply radiant heat at a high temperature to successive portions of stock or work passing through a heating station and from which the work is immediately fed at a desired high temperature to material working equipment for hot working operations, such heating of the work being effected in a single pass and at a rate to permit the work to pass through the heating station as fast as the material working operations can be performed on the thus heated work.

The novel features which I believe to be characteristic of my invention are set forth with particularity in the claims. The invention, both as to organization and method, together with further objects and advantages thereof, will be better understood by reference to the following description taken in connection with the accompanying drawings forming a part of this specification, and of which:

Fig. 1 is a side elevation, partly in section, of apparatus embodying the principles of my invention for rapidly heating work or stock at a first heating station prior to being fed to processing or working equipment and for heating the work at a second heating station into which the work is fed from the equipment;

Fig. 2 is a top plan view, partly in section, of the apparatus shown in Fig. 1, to illustrate the invention more clearly;

Fig. 3 is a side elevation, partly in section, of apparatus similar to that shown in Figs. 1 and 2 and illustrating another embodiment in which a third heating station is interposed between two sections or stages of the processing or working equipment;

Fig. 4 is an enlarged fragmentary sectional view of the quenching device associated with certain of the heating stations shown in Figs. 1 to 3 inclusive;

Fig. 5 is a side elevation, partly in section, of apparatus similar to that shown in Figs. 1 to 3 inclusive illustrating another embodiment of the invention;

Fig. 6 is a vertical sectional view, taken on line 6—6 of Fig. 7, illustrating one of the burner units embodied in the heating stations shown in Fig. 5; and Fig. 7 is a vertical sectional view, taken on line 7—7 of Fig. 6, to illustrate the burner units more clearly.

In Figs. 1 and 2 of the drawings my invention has been shown as applied to a rolling mill 10 at the ends of which are located heating stations 11 and 12 for rapidly heating bar stock or work 14 to a desired high temperature immediately prior to entering the rolling mill, and for rapidly heating the work immediately upon leaving the rolling mill. The rolling mill 10 is more or less diagrammatically illustrated to provide for three stages of reduction of the stock or work 14, each reduction stage including a pair of driven rollers 16 and 17 between which the work is passed. Each pair of driven rollers 16 and 17 is suitably mounted on a framework 18 supported on a bedplate 19 and driven by an electrical motor 20 adapted to be connected to a source of electrical energy.

The work 14, which is rapidly heated at the heating station 11 to a desired high temperature, as will be described presently, passes between the first pair of driven rollers 16 and 17. The material of the stock is hot worked by reducing the cross section thereof as it passes through the first pair of driven rollers 16 and 17. The stock is further hot worked as it passes through each successive pair of driven rollers 16 and 17, and passes from the rolling mill reduced in section. Although only three stages of reduction have been illustrated, it is to be understood that in practice the rolling mill will be provided with as many stages of reduction as is necessary to effect the desired working of the stock passing therethrough.

In accordance with my invention, the heating station 11 is provided immediately ahead of the rolling mill 10 for rapidly heating the stock 14 to a desired high temperature by localized heating effects and at a rate as fast as the working operations are performed on the heated stock in the rolling mill 10. The heating station 11 is formed with a central heating space 21 through which the stock 14 passes to the rolling mill 10. It is to be understood that suitable guiding and driving rollers may be provided at the left-hand side of heating station 11 to insure a continuous end to end or lengthwise movement of a number of work pieces or long lengths of stock 14 to the heating station 11.

The heating space 21 is formed within heating station 11 by vertical side walls 22, end walls 23, a rool 24 and a floor 25. These parts are formed of suitable refractory material and disposed within a framework or outer shell 26 supported by a foundation 27 on the bed-plate 19. The outer shell 26 may include hollow end sections 28 through which a suitable cooling medium, such as water, for example, may be circulated in any suitable manner (not shown) to effect cooling and prevent excessive heating of the outer shell of the heating station 11, especially when the latter is being operated to produce extremely high temperature heating effects.

When the work or stock 14 is formed of metal, glass and plastic materials, for example, such work or stock can be rapidly heated with localized heating effects to a desired high temperature for subsequent hot working operations by applying radiant heat to the work during movement thereof through the heating station 11. In the present embodiment a plurality of burners 29 mounted and incorporated in each of the side walls 22 of the heating space 21 are employed as sources of radiant heat. In Figs. 1 and 3, four burners 29 are disposed alongside of each other at each of the side walls 22 at approximately the same horizontal plane at which the work passes through the heating space 21.

Each burner 29 comprises a molded block of refractory material formed with a cup-shaped space or cavity 30 facing the work 14 and having a central passage within which is disposed a burner tube or sleeve 31. The outer ends of the sleeves 31 are connected by conduits 32 to manifolds 33 to which a gas mixture is delivered through flexible supply lines 34 from a suitable source of supply. Suitable valves 35 may be provided to control the pressure and rate at which the gas mixture is supplied to the manifolds 33, and the supply of the gas mixture for each burner 29 may be individually controlled by a valve (not shown) operable by control member 36 disposed at the exterior of the manifold 33.

The gas mixture, which may be a mixture of air and ordinary city gas or the like, for example, is supplied to each of the burners 29 and subdivided into a plurality of gas streams or jets by a distributor or tip 37 fixed to the inner end of each sleeve 31 which terminates at a cup-shaped cavity or space 30. A plurality of flames are produced and maintained about the peripheral surface of each distributor 36 and project outwardly therefrom into the cup-shaped spaces 30 in which combustion of the gas mixture is effected. The combustion spaces 30 are of such shape and the flames project outwardly at such an angle from the axes of the burners that the flames are closely adjacent to and follow the cup-shaped refractory walls to heat the latter to high incandescent temperatures.

The burners 29 are of the kind described and illustrated in Hess Patent No. 2,215,079 granted on September 17, 1940, and assigned to the same assignee as this application. The burners 29 are fully described in the aforementioned Hess patent which may be considered as being incorporated in this application, and, if desired, reference may be had thereto for a detailed description of the burner structure.

While the refractory surfaces of the cavities 30, which will hereinafter also be referred to as sources of radiant heat, are shown in Fig. 2 as being spaced a short distance from the work 14 for purposes of illustration, in actual practice the peripheral edges of the radiant heat sources 30 may be spaced from the work a distance from 1½ to 2 inches. The burners 29 are so constructed that, even under these conditions, combustion of the gas mixture is substantially completed in the cavities, so that flame impingement on the work is avoided. The refractory wall surfaces of the cavities are heated to incandescence by heat derived from combustion of the gas mixture and constitute localized high temperature zones or regions from which heat is radiated to the work.

In addition, the portion of the work 14 in heating space 21 is completely enveloped by the high temperature products of combustion formed in the cavities 30. Thus, the work is not only heated by heat radiated from the radiant heat sources but also by heat derived from the high temperature products of combustion.

By restricting the size of the openings 38 at each end of the heating space 21 through which the high temperature products of combustion pass into the atmosphere, the pressure of the gases within the heating space will build up and may exceed atmospheric pressure by a pressure equivalent to several inches of a column of water. Under these conditions a "back pressure" is developed in the cavities or radiant heat sources 30, whereby the rate of combustion at the burners 29 is accelerated and the temperature at which combustion takes place is increased. Under these operating conditions the capacity of the burners 29 is increased and the gas mixture delivery pressure can be increased correspondingly to produce extremely high incandescent temperatures at the radiant heat sources 30.

When the work 14 is of such size that a dimension of a surface thereof facing the radiant heat sources 30 is substantially the same or greater than the diameter of the radiant heat sources and the latter are positioned very close to the work, as by a distance of 1½ to 2 inches, the pressure of the gases confined in the cavities will build up because of this close spacing and exceed atmospheric pressure. It is to be understood that such gas pressures above atmospheric will be developed in the cavities 30 when the gas mixture delivery pressures are properly correlated to the capacity of the burners 29. Hence, in addition to building up a "back pressure" of the gases blanketing the radiant heat sources by restricting the outlet openings 38, the same result may be obtained by closely spacing the radiant heat sources with respect to the work to form a restricted outlet therebetween for outward flow of the high temperature products of combustion from within the cavities.

The extent of heating of the work by heat derived from the high temperature products of combustion is dependent upon the temperature of these combustion gases and the rate of flow thereof over the work surfaces. The development of a "back pressure" at the radiant heat sources 30 is believed to contribute materially to the high incandescent temperatures produced and the fast rate at which heat is transferred to the work, thereby permitting successive portions of the work to be progressively heated to high temperatures in the heating station 11 and at a rate as fast as the working operations are performed by the rolling mill 10.

The distribution and number of radiant heat sources for any particular heating station will be dependent upon the composition or character of the work, the size and shape of the work, the speed at which the work must pass through the heating station, and the temperature to which the work must be heated. Referring to Fig. 1, for example, additional burners have been shown at the roof 24 of the heating space 21. These burners 29 are similar to the burners previously described and incorporated in the side walls 22 of the heating space 21. The connections for supplying the gas mixture to the burners 29 at the roof 24 have not been illustrated in order to simplify the drawings, but it is to be understood that these burners may be provided with connections 32, a manifold 33 and a flexible supply conduit 34, together with suitable control valves, as illustrated in Fig. 2 for the burners 29 at the vertical sides 22 of the heating space 21.

I have found that the provision of a heating station ahead of material working equipment, such as the heating station 11 ahead of the rolling mill 10, for example, possesses many advantages, one of which is that the work can be rapidly heated to a high temperature in a short interval of time and as fast as the working operations can be performed on the heated work. The crux of such rapid heating is due to the provision of localized high temperature heating effects spaced closely with respect to the work as the latter is moving continuously through the heating station on its way to the material working equipment.

In the embodiment illustrated in Figs. 1 and 2, in which sources of radiant heat are employed to produce the high temperature localized heating effects, the rate at which heat is radiated from such radiant heat sources to the work is proportional to the difference between the fourth powers of the absolute temperatures of the radiant heat sources and the work. In view of this it will be appreciated that any increase in temperature developed at the radiant heat sources, even if only a few hundred degrees Fahrenheit, will contribute materially to the thermal head or temperature differential between the radiant heat sources and the work and hence the rate of heat transfer to the latter.

By operating the radiant heat sources 30 in the manner described above, it has been possible to increase the heating temperatures developed from about 2000 to 2100° F., as is the case when the burners are operated as described in the above-mentioned Hess patent, to heating temperatures of about 2700 to 2900° F. under the operating conditions described above, when a gas mixture is employed consisting of air and ordinary city gas having a rating of about 550 B. t. u. per cubic foot.

High temperature sources of radiant heat capable of developing localized heating effects as high as 2700 to 2900° F. play an important part in processing work whereby the unheated work can be rapidly heated to a high temperature and then immediately passed to the material working equipment. Thus, when it is desired to hot work ferrous metals, it may sometimes be necessary to heat such unheated work to temperatures as high as 1900 to 2000° F., and in hot working copper or brass it may be necessary to bring such unheated work to temperatures as high as 1400° F. It has been successfully demonstrated that high temperature sources of radiant heat, in which localized heating effects are produced and like those described above, develop sufficiently high temperatures and produce an adequate thermal head to make practicable the continuous processing of work or stock by first rapidly heating the unheated work to a desired high temperature and immediately passing the thus heated work to the processing or working equipment.

By utilizing heat derived from combustion of a combustible gaseous mixture to develop high temperatures at the radiant heat sources 30, the work in the heating space 21 is enveloped by the heated products of combustion and additional heating of the work is effected by these high temperature gases, as stated above. Due to the relatively short time in which successive portions of the work remain in the heating space 11, the work is exposed to the high temperature products of combustion only for a short period, so that the formation of scale on the work due to oxidation is materially reduced when compared to the slow heating of work in conventional practices heretofore employed.

When it is contemplated to heat unheated steel bars 5/8" x 1" to a high temperature at a rate of about 300 to 400 feet per minute to prepare such work for subsequent hot metal working operations, it will be appreciated that the total heating time for successive portions of the steel bar stock will be only a matter of seconds rather than many minutes or hours, and that the work will be exposed to the high temperature products of combustion only for an extremely short period of time. Further, such rapid heating of the work is particularly important where the problem of decarburization of ferrous metals is present. By reason of the extremely short heating period in the heating station ahead of the metal working equipment, decarburization is materially reduced and negligible when compared to the conventional heating practices heretofore employed.

After the material working operations have been performed, as on metal, for example, it is often desirable to heat treat the work. Such heat treatment may be effected by annealing the work after it has become "work hardened", and in certain instances the thus heated work may be quenched with a suitable cooling medium to produce the desired anneal. Such heat treatment is effected in the embodiments shown in Figs. 1 and 2 by the heating station 12. The heating station 12 is generally similar to the heating station 11 described above, and parts in heating station 12 similar to those in heating station 11 are referred to by the same reference numerals. The radiant heat sources 30 in heating station 12 are capable of developing temperatures of 2700 to 2900° F. in the same manner as the radiant heat sources 30 in heating station 11, and a "back pressure" may be developed in the combustion spaces or cavities 30 in the heating station 12, either by restricting flow of the high temperature products of combustion through the openings 38 at the ends of heating space 21 or by forming restricted outlets between the radiant heat sources 30 and a surface of the work.

Provision is made for quenching the heated work 14 immediately upon passing from the heating station 12 when such quenching is desired. Referring to Figs. 1, 2 and 4, a quenching device 40 includes an annular-shaped hollow manifold 41 secured to framework 42 associated with a tank 43 disposed below the bed-plate 19. A suitable cooling liquid, such as water, for example, is supplied to the manifold 41 through a conduit 44 in which is connected a control valve 45, as shown in Fig. 2.

The face of the manifold 41 removed from the heating station 12 is formed with a rounded inner corner at which region a plurality of openings 46 are provided. The slots or openings 46 are distributed about the rounded inner corner of the manifold 41 and are formed so as to direct a plurality of streams or jets of the cooling medium about the entire periphery of the work in a direction away from rather than toward the opening 38 of the heating space 21 through which the heated work passes from the heating station 12.

A ring-shaped shield or baffle 47, which slopes inwardly and toward the central opening of the annular manifold 41, is provided on the face of the latter adjacent to the heating station 12, so as to catch droplets of the cooling medium and reduce the tendency of the cooling medium to pass toward the heating station 12. A skirt or baffle plate 48 also extends downwardly from the manifold 41 into the tank 43, as shown most clearly in Fig. 1, so as to direct the cooling medium down into the tank. A suitable pump (not shown) may be provided for recirculating the cooling medium from the tank 43 through the conduit 44 to the manifold 41.

In any particular installation, the desired number of heating stations may be interposed between sections or stages of the equipment provided to perform the working operations on the work or stock. In Fig. 3 is illustrated an embodiment of the invention in which a heating station 11a is provided immediately ahead of a first section 10a of a rolling mill, and a second heating station 11b is interposed between the first rolling mill section 10a and a second rolling mill section 10b. As in the embodiments shown in Figs. 1 and 2 and described above, a heating section 12a may be provided to heat treat the work or stock after the working operations have been performed in the second rolling mill section 10b.

The heating station 11a is similar to the heating station 11, and the heating stations 11b and 12a are similar to the heating station 12 in Figs. 1 and 2 in that apparatus is associated therewith for quenching the work or stock immediately after the latter has been heated to the desired high temperature. Since the heating stations and rolling mill sections in Fig. 3 are similar to those described above, like parts have been designated by the same reference numerals. While three stages of reduction have been shown for each rolling mill section 10a and 10b, it is to be understood that in practice each rolling mill section will be provided with as many stages of reduction as is necessary to effect the desired hot working of the stock passing therethrough.

The radiant heat sources 30 in heating stations 11a, 11b and 12c are capable of developing temperatures of 2700 to 2900° F. in the same manner as the radiant heat sources embodied in the heating stations 11 and 12 in Figs. 1 and 2, and a "back pressure" may be developed in the combustion spaces or cavities forming the radiant heat sources 30 of heating stations 11a, 11b and 12a, either by restricting flow of the high temperature products of combustion through the openings 38 at the ends of the heating stations, or by forming restricted outlets between the radiant heat sources and the work surfaces, as described above.

In Figs. 5 to 7 inclusive I have more or less diagrammatically shown another embodiment of the invention including a rolling mill 10c at the ends of which are provided heating stations 11c and 12c, respectively. While only two stages of reduction have been shown in the rolling mill 10c, in which parts like those shown in the previous embodiments are designated by the same reference numerals, it is to be understood that any number of stages of reduction may be provided to effect the desired hot working of the work or stock passing therethrough.

The heating stations 11c and 12c differ from the heating stations illustrated in Figs. 1 to 3 inclusive and described above. As shown most clearly in Figs. 6 and 7, radiant heat sources 72 in heating spaces 57 are heated to high incandescent temperatures by high temperature heated products of combustion produced in combustion spaces 69 closely adjacent to the radiant heat sources. The high temperature products of combustion are discharged at a relatively high velocity from the combustion spaces through restricted outlets 70 and pass over the radiant heat sources 72 to heat the latter to high incandescent temperatures.

As shown in Fig. 5, each heating station 11c and 12c comprises four heating units 50 in abutting relation alongside of each other. The heating units 50 of each heating station may be mounted on suitable framework 51 including a table portion 52 which is supported by vertical angle members 53 on the bed-plate 19. The extreme ends of one or more metal strips or bars 54, which extend across the top of the heating units, are secured to the upper ends of vertical angle members 55 having the lower ends thereof secured to the horizontal table portion 52 of the framework 51.

Referring more particularly to Figs. 6 and 7, each heating unit 50 comprises two vertically disposed burners 56 formed to provide a circular heating space 57 when in face to face relation. Each burner 56 includes a hollow base member 58 having several cross partitions 59 to form a plurality of inlet chambers 60. Each base member 58 is provided with a plurality of threaded inlet openings 61 to which are connected conduits 62, as shown most clearly in Fig. 5. The conduits 62 associated with each burner are connected to a manifold 63 to which a gas mixture is delivered through a supply line 64 from a suitable source of supply. Suitable valves 65 may be provided in the supply lines 64 to control the pressure and rate at which the gas mixture is supplied to each manifold 63 and hence to each of the burners 56.

Referring to Figs. 6 and 7, the base members 58 are formed to receive a burner screen 66 having a plurality of openings or passages 67. The burner screens 66 may comprise a plurality of relatively thin plates stacked and closely held together. One face of each plate may be formed with a plurality of slots of relatively narrow depth and the plates stacked together with the slotted face of each plate, except one end plate, contiguous to and contacting a smooth face of an adjacent plate. While not to be limited thereto, the thin plates providing the burner screen 66 may be formed of suitable refractory material. A cross rib 68 is provided in each inlet chamber 60 adjacent to the inlet 61 to cause spreading of the gas mixture introduced into the inlet chamber, so that the gas mixture may be uniformly distributed for flow through the burner screen 66.

The burners 56 are formed with refractory lined combustion chambers 69 into which the gas mixture is introduced through the burner screen 66. In the illustrated embodiment the combustion chambers 69 are elliptical in section and provided with restricted outlets 70. The hollow refractory body 71 forming the combustion chamber 69 of each burner 56 is provided with opposing curved or rounded portions 72 projecting beyond the restricted outlets 70 to form a semi-circular space or trough. The semi-circular spaces or recesses of each pair of burners 56 in face to face relation cooperate to form a portion of the circular or cylindrical heating space 57 of each heating station 11c and 12c.

The burners 56 are formed with outer casings or shells 73 which may be hollow and through which a suitable cooling medium, such as water, for example, may be circulated in any suitable manner (not shown) to effect cooling and prevent excessive heating of the shells of the burners 56, especially when the latter are being operated to produce extremely high temperature heating effects.

It has been stated above that the burners 56 forming each heating unit 50 are secured together at the heating stations by the framework 51. In order to provide adequate space for the discharge of the high temperature products of combustion from the heating spaces 57 at the heating stations 11c and 12c, the abutting faces of the curved or rounded portions 72 may be roughened, as indicated at 74 in Fig. 6. In this way the heating spaces 57 will always be completely filled with high temperature heating gases and such gases may pass from the open ends of the heating spaces and also through the gaps formed between the roughened contacting faces 74. Instead of roughening the abutting faces of curved or rounded portions 72, the lateral edges of these portions may be formed with recesses which cooperate to form small channels or apertures when the burners 56 are secured in position alongside each other, so that the heated gases can escape from within the heating spaces 57 through such channels to the exterior of the heating units as well as from the open ends of the heating spaces 57.

When it is desired to operate heating stations 11c and 12c, a gas mixture, such as, for example, a mixture of air and ordinary city gas and the like, is supplied to each of the burners 56. When the burners 56 are relatively cool and at the temperature of the surroundings, the gas mixture supplied thereto passes through the inlet chambers 60, burner screens 66, combustion chambers 69 and restricted outlets 70 into the heating spaces 57. The gas mixture is initially supplied at a low pressure, so that the gas mixture discharged from the open ends of the heating spaces 57 can be ignited to produce flames at the ends of these spaces. After the gas mixture has been ignited in the manner just described, the delivery pressure of the gas mixture supplied to the burners 56 is reduced sufficiently to cause the flames to backfire from the heating spaces 57 through the restricted outlets 70 of each heating unit 50 into the combustion chambers 69, so that burning of the gas mixture will be effected at the sides of the burner screens 66 facing the combustion chambers 69.

When the flames are being maintained within the combustion chambers 69, the pressure of the gas mixture supplied to the burners 57 may be increased. After a short interval of time the flames maintained in the combustion chambers effect such heating of the inner refractory linings of the chambers that the linings are heated to high incandescent temperatures. Due to heating the inner refractory linings of the combustion chambers 69 to high incandescent temperatures, and subjecting the gas mixture entering the combustion chambers to intense heat radiated from the highly heated incandescent surfaces forming the linings, substantially complete combustion of the gas mixture may be effected in the combustion chambers before the gas mixture reaches the restricted outlets 70.

By confining the combustion or burning of the gas mixture within the combustion chambers 69 which are substantially closed and provided with the restricted outlets 70, the combustion chambers may be maintained above atmospheric pressure during normal operation of the burners 56. Stated another way, the outlets 70 restrict the flow of the high temperature products of combustion and develop a "back pressure" in the combustion spaces. During such normal burner operation the gas mixture delivery pressure, when air and ordinary gas are employed, for example, may be as high as 3 to 5 lbs. per sq. in. and even higher. When operating with a gas mixture of air and ordinary city gas having a rating of about 550 B. t. u. per cu. ft., it is possible to develop temperatures in the combustion chambers 69 as high as 2700 to 2900° F. and higher.

Since the gas mixture is supplied at a temperature of about 70° F. to the burners 56 and heated to a temperature of 2900° F. and higher, the gases expand over six fold and at a rate directly proportional to increase in absolute temperature. Hence, relatively large volumes of high temperature gases are discharged from the combustion chambers 69 through the restricted outlets 70. In burners like the burners 56 the heated products of combustion may be discharged from the combustion chambers in the form of gas streams at an average velocity of 700 feet or more per second.

The high temperature gases discharged into the heating spaces 57 of the heating stations 11c and 12c through the restricted outlet 70 pass over and contact the curved or rounded refractory surfaces 72 and heat the latter to high incandescent temperatures. The work or stock 14 passing through the heating spaces 57 directly opposite the restricted outlets 70 serves to promote the spreading of the high temperature gases against and over the curved refractory surfaces 72, so that these regions will be heated to high temperatures substantially corresponding to the high temperatures developed in the combustion chambers 69.

The work or stock passing through the heating stations 11c and 12c is rapidly heated by heat radiated from the curved incandescent refractory surfaces 72, which constitute and serve as the sources of radiant heat, and by heat derived from the high temperature heated products of combustion completely enveloping the work and passing at a relatively high velocity over the work in the heating spaces 57. The high temperature gases pass from the heating spaces 57 through the gaps 74 and are also discharged at the opposite ends of each heating station. As in the previously described embodiments, the refractory surfaces or radiant heat sources 72 may be spaced a relatively short distance from the work 14, as from ½ to 2 inches, for example.

Work or stock formed of metal, glass, plastics and other materials can be rapidly heated to a desired high temperature with localized heating effects in the manner just described and illustrated in Figs. 5 to 7 inclusive, and such heating may be accomplished at a rate as fast as the working operations are performed on the stock by the rolling mill 10c. The size and number of the heating units 50 required for any particular heating station will be dependent upon the composition of the work or stock, the size and shape of the work, the speed at which the work must pass through the heating stations, and the temperatures to which the work must be heated. It is to be understood that suitable guiding and driving rollers may be provided at the left-hand side of heating station 11c to insure a continuous end to end or lengthwise movement of a number of work pieces or long lengths of stock 14 to the heating station 11.

Although only two heating stations 11c and 12c have been illustrated in Fig. 5 at each end of the rolling equipment 10c, it is to be understood that additional heating stations similar to the heating station 12c may be interposed between sections of rolling equipment, as in the embodiment illustrated in Fig. 3 and described above.

In the processing of stock or work, it may be desirable to heat treat the work after the working operations have been accomplished. This is a function of heating station 12c with which is associated quenching apparatus like that shown in Figs. 1 to 4 inclusive and previously described. Thus, when it is desired to anneal work or stock formed of metal after the metal working operations have been accomplished, such annealing may be effected as one step in the processing of work in which the work is continuously in motion and always moving at a rate as fast as the metal working operations are performed.

The heating stations 12, 12a and 12c in the different embodiments described are especially suitable for the bright or clean annealing of work formed of copper, brass, bronze, nickel or stainless steel. Although the work may be oxidized when being subjected to hot metal working operations just before entering the final heating station, such work may be deoxidized and cleaned while passing through the last heating station. This is effected by operating the burners 29 of the heating stations 12 and 12a and the burners 56 of the heating station 12c with excess gas to produce a reducing atmosphere in the heating spaces of these heating stations.

It will now be understood that stock or work can be processed by first rapidly heating unheated work to a desired high temperature at a first heating station, then subjecting the heated work to working operations by equipment which have one or more heating stations interposed between sections of such equipment, and finally heating and processing the work at a last heating station to impart the desired physical properties to the work. The provision of heating stations like those illustrated and described above enables such processing of work to be accomplished while the work is constantly in motion from the time the work is placed "on the processing line" until the final processing step has been performed. This is realized by providing at the heating stations a plurality of relatively small radiant heat sources capable of developing high temperatures, so that fast heat transfer to the work will be accomplished while the work is constantly in motion. Thus, when it is contemplated to pass the work or metal stock at a rate of speed of 300 to 400 feet per minute through metal working equipment, it is within the province of the invention to provide heating stations capable of transferring heat sufficiently rapidly to the work so that the work will be heated to a desired high temperature while it is moving at the same rate or speed at which the metal working operations are performed by the metal working equipment. In other words, heat treatment of the work or metal stock is accomplished at the heating stations while the work is passed therethrough at "mill speed."

The radiant heat sources 30 in Figs. 1 to 3 inclusive and the radiant heat sources 72 in Figs. 5 to 7 inclusive constitute localized high temperature sources of heat from which a preponderance of major portion of heat is radiated directly to the work 14 passing through the heating stations. The combustible gaseous mixture supplied to each of the burners 29 in Figs. 1 to 3 may be individually controlled, as explained above, so that the high temperature radiant heat zones formed by the cavities 30 may be individually regulated whereby the desired heating of the work may be effected. Likewise, in the embodiment in Figs. 5 to 7 inclusive, each heating unit 50 comprising two burners 56 in face to face relation may be individually controlled, whereby the high temperature radiant heat zones 72 of each heating unit may be individually regulated so that the desired heating of the work passing through the heating stations 11c and 12c may be effected.

By individually heating the radiant heat zones 30 of the burners 29 and the radiant heat zones 72 of each heating unit 50 by heat derived from combustion of a combustible gaseous mixture, high incandescent temperatures are developed. In the burners 29 combustion of the gaseous mixture takes place in the cavities 30 closely adjacent to the radiant heat zones; and in the heating units 50 combustion of the gaseous mixture takes place in the combustion chambers 69 which are closely adjacent to and in the immediate vicinity of the radiant heat zones 72.

By applying radiant heat to opposite sides of the work 14 as it passes through the heating stations, effects resulting from the application of such radiant heat on one side of the work are compensated for by the effects produced by similarly applying radiated heat to the opposite side of the work.

One of the advantages accruing from the provision of heating stations like those described is that the high temperatures developed to obtain a high rate of heat transfer to the work is realized by effecting combustion of the gas mixture in spaces from which flow of the heated products of combustion is restricted, so that a "back pressure" will be developed to accelerate the rate and increase the temperature at which combustion takes place. Further, when stoppage of work occurs and the supply of the gas mixture to the heating stations is shut off, the employment of relatively small sources of radiant heat possesses the further advantage that melting of the work is avoided even when the work remains stationary within the heating spaces at the heating stations.

In many applications it will be desirable to effect substantially uniform heating of the work to a desired high temperature at a heating station, and in other instances it will be preferable to heat the outer surface of the work to a higher temperature than the inner core thereof, so that the cooling effect of the rolls or dies on the work surfaces will ultimately produce a substantially uniform temperature throughout the work. In any event, it is within the province of the invention to effect substantially complete heat saturation of the work to a desired high temperature at a heating station, or to effect such heat saturation of the work that the outer surface is at a higher temperature than the inner core. In the claims, therefore, the words "heat saturated to a desired temperature" should be interpreted to include either surface heat saturation of work or heat saturation of work in its entirety to such a desired high temperature.

Although I have shown and described several embodiments of my invention, such variations and modifications are contemplated as fall within the true spirit and scope of my invention. For example, it may be possible to employ sources of radiant heat differing from those shown and described herein. Further, it may be desirable to provide heating stations through which the work or stock to be heated passes in an irregular path of movement rather than in a straight line. I therefore aim in the following claims to cover all changes and modifications which fall within the true spirit and scope of the invention.

What is claimed is:

1. In the art of processing work of elongated extent normally passing at a desired high temperature to a place in which one or more working operations are performed on the work, the improvement which comprises passing the work through a place of heating, progressively heating successive longitudinal portions of the work by directing a cluster of converging radiant heat rays in said place of heating above the periphery of the work in such a manner that the rays overlap at the peripheral surface of the work so as to heat saturate successive longitudinal portions of the work substantially uniformly about the entire periphery thereof to the desired high temperature before leaving the place of heating, producing the radiant heat rays by combustion of fuel at a number of regions at close range to the work in such a manner that flame impingement of the work is avoided and said radiant heating of the work will be augmented by convection heating effected by the high temperature combustion gases which completely envelop the work and sweep at a relatively high velocity over the peripheral surface thereof and discharge into the atmosphere at the regions at which the work enters and leaves the place of heating, and passing the work continuously through the place of heating.

2. In the art of processing work of elongated extent which comprises passing the work through a place of heating for progressively heating successive longitudinal portions of the work to a desired high temperature, progressively heating successive longitudinal portions of the work at the place of heating by directing a cluster of converging radiant heat rays in the place of heating about the periphery of the work in such a manner that the rays overlap at the peripheral surface of the work so as to heat saturate successive longitudinal portions of the work substantially uniformly about the entire periphery thereof to the desired high temperature producing the radiant heat rays in the place of heating by combustion of fuel at a number of regions at close range to the work in such a manner that flame impingement of the work is avoided and said radiant heating of the work will be augmented by convection heating effected by the high temperature combustion gases which completely envelop the work and sweep at a relatively high velocity over the peripheral surface thereof and discharge into the atmosphere at the regions at which the work enters and leaves the place of heating, and passing the work continuously through the place of heating.

3. In the art of processing metal work of elongated extent, such as, for example, copper, brass, bronze and stainless steel, the improvement which comprises, passing the work through a place of heating, progressively heating successive longitudinal portions of the work by directing a cluster of converging radiant heat rays in said place of heating about the periphery of the work in such a manner that the rays overlap at the peripheral surface of the work so as to heat saturate successive longitudinal portions of the work substantially uniformly about the entire periphery thereof to a desired high temperature to anneal the work before it leaves the place of heating, producing the radiant heat rays by combustion of fuel at a number of regions at close range to the work in such a manner that flame impingement of the work is avoided and said radiant heating of the work will be augmented by convection heating effected by the high temperature combustion gases which completely envelop the work and sweep at a relatively high velocity over the peripheral surface thereof and discharge into the atmosphere at the regions at which the work enters and leaves the place of heating, the high temperature combustion gases discharged into the atmosphere at the region at which the work leaves the place of heating enveloping the work at a vicinity outside the place of heating immediately adjacent to such region, rapidly cooling successive longitudinal portions of the work immediately upon leaving the place of heating by applying a quenching medium thereto at said vicinity at which the work is enveloped by the high temperature combustion gases, and passing the work continuously through the place of heating.

4. In the art of heat treating metal work of elongated extent, such as, for example, copper, brass, bronze and stainless steel, the improvement which comprises passing the work through a place of heating, progressively heating successive longitudinal portions of the work by directing a cluster of converging radiant heat rays in said place of heating about the periphery of the work in such a manner that the rays overlap at the peripheral surface of the work so as to heat saturate successive longitudinal portions of the work substantially uniformly about the entire periphery thereof to a desired high temperature to anneal the work before it leaves the place of heating, producing the radiant heat rays by combustion of fuel at a number of regions at close range to the work in such a manner that flame impingement of the work is avoided and said radiant heating of the work will be augmented by convection heating effected by the high temperature combustion gases which completely envelop the work and sweep at a relatively high velocity over the peripheral surface thereof and discharge into the atmosphere at the regions at which the work enters and leaves the place of heating, the high temperature combustion gases discharged into the atmosphere at the region at which the work leaves the place of heating enveloping the work at a vicinity outside the place of heating immediately adjacent to such region, and rapidly cooling successive longitudinal portions of the work immediately upon leaving the place of heating by applying a quenching medium thereto at said vicinity at which the work is enveloped by the high temperature combustion gases.

5. In the art of heating metal work of elongated extent which comprises passing the work through a place of heating, progressively heating successive longitudinal portions of the work by directing a cluster of converging radiant heat rays in said place of heating about the periphery of the work in such a manner that the rays overlap at the peripheral surface of the work so as to heat saturate successive longitudinal portions of the work substantially uniformly about the entire periphery thereof to an elevated temperature before leaving the place of heating, and producing the radiant heat rays by complete combustion of fuel at a number of regions at close range to the work in such a manner that combustion is completed before flames can touch the work and said radiant heating of the work will be augmented by convection heating effected by the high temperature combustion gases which completely envelop the work and sweep at a relatively high velocity over the peripheral surface thereof and discharge into the atmosphere at the regions at which the work enters and leaves the place of heating.

6. In the art of processing ferrous metal work of elongated extent which comprises passing the work through a place of heating, progressively heating successive longitudinal portions of the work by directing a number of rows of converging radiant heat rays in said place of heating about the periphery of the work in such a manner that the rays overlap at the peripheral surface of the work so as to heat saturate successive longitudinal portions of the work substantially uniformly about the entire periphery thereof to an elevated temperature before leaving the place of heating, producing the radiant heat rays by combustion of fuel at a number of regions at close range to the work in such a manner that flame impingement of the work is avoided and said radiant heating of the work will be augmented by convection heating effected by the high temperature combustion gases which completely envelop the work and sweep at a relatively high velocity over the peripheral surface thereof and discharge into the atmosphere at the regions at which the work enters and leaves the place of heating, the high temperature combustion gases discharged into the atmosphere at the region the work leaves the place of heating enveloping the work at a vicinity outside the place of heating immediately adjacent to such region, and rapidly cooling successive longitudinal portions of the work immediately upon leaving said place of heating by applying a quenching medium thereto at said vicinity at which the work is enveloped by the high temperature combustion gases.

7. In the art of processing ferrous metal work of elongated extent which comprises passing the work through a first place of heating, progressively heating successive longitudinal portions of the work by directing a number of rows of converging radiant heat rays in the first place of heating about the periphery of the work in such a manner that the rays overlap at the peripheral surface of the work so as to heat saturate successive longitudinal portions of the work substantially uniformly about the entire periphery thereof to an elevated temperature before leaving the place of heating, producing the radiant heat rays by combustion of fuel at a number of regions at close range to the work in such a manner that flame impingement of the work is avoided and said radiant heating of the work will be augmented by convection heating effected by the high temperature combustion gases which completely envelop the work and sweep at a relatively high velocity over the peripheral surface thereof and discharge into the atmosphere at the regions at which the work enters and leaves the first place of heating, the high temperature combustion gases discharged into the atmosphere at the region the work leaves the first place of heating enveloping the work at a vicinity outside said place of heating and immediately adjacent to such region, rapidly cooling successive longitudinal portions of the work immediately upon leaving said place of heating by applying a quenching medium thereto at said vicinity at which the work is enveloped by the high temperature combustion gases, thereafter passing the work through a second place of heating for progressively reheating successive longitudinal portions thereof to a desired high temperature to condition the same, and passing the work through the second place of heating at a rate at least as fast as that at which the work passes through the first place of heating so that the initial heating, cooling and reheating of the work may be accomplished in a continuous process.

8. In the art of heating metal work of elongated extent, the steps which comprise passing the work through a place of heating, progressively heating successive longitudinal portions of the work by directing converging radiant heat rays in said place of heating about the periphery of the work in such a manner that the rays engage the entire peripheral surface of the work so as to heat saturate successive longitudinal portions of the work substantially uniformly about the entire periphery thereof to an elevated temperature before leaving the place of heating, and producing the radiant heat rays directly in the place of heating, traversed by the work by complete combustion of fuel at a plurality of regions directly exposed to the work in such a manner that combustion is completed before flames can touch the work, and said radiant heating will be augmented by convection heating effected by high temperature combustion gases which completely envelop the work and sweep at a relatively high velocity over the surface thereof and discharge into the atmosphere.

FREDERIC O. HESS.

REFERENCES CITED

The following references are of record in the file of this patent:

UNITED STATES PATENTS

| Number | Name | Date |
|---|---|---|
| 638,984 | Palmer | Dec. 12, 1899 |
| 800,951 | Somers | Oct. 3, 1905 |
| 1,676,176 | Biggert | July 3, 1928 |
| 1,676,685 | Cammen | July 10, 1928 |
| 1,686,083 | Geiger | Oct. 2, 1928 |
| 1,718,806 | Witting | June 25, 1929 |
| 1,732,244 | Salzman | Oct. 22, 1929 |
| 1,905,810 | Cowan et al. | Apr. 25, 1933 |
| 1,946,971 | Harter | Feb. 13, 1934 |
| 2,019,555 | Wood | Nov. 5, 1935 |
| 2,091,340 | Sutherland | Aug. 31, 1937 |
| 2,178,451 | Jones | Oct. 31, 1939 |
| 2,197,524 | Green | Apr. 16, 1940 |
| 2,209,373 | Anderson | July 30, 1940 |
| 2,215,080 | Hess | Sept. 17, 1940 |
| 2,237,309 | McMinn | Apr. 8, 1941 |
| 2,409,431 | Hess | Oct. 15, 1946 |